United States Patent [19]

Mani et al.

[11] Patent Number: 4,504,373
[45] Date of Patent: Mar. 12, 1985

[54] ELECTRODIALYTIC WATER SPLITTING PROCESS AND APPARATUS FOR CONVERSION OF ALKALI METAL SULFATE VALUES DERIVED FROM SPENT RAYON SPIN BATHS

[75] Inventors: Krishnamurthy N. Mani, Denville; Frederick P. Chlanda, Rockaway, both of N.J.

[73] Assignee: Allied Corporation, Morris Township, Morris County, N.J.

[21] Appl. No.: 487,651

[22] Filed: May 2, 1983

Related U.S. Application Data

[63] Continuation-in-part of Ser. No. 383,879, Jun. 1, 1982, abandoned.

[51] Int. Cl.³ ............................................. B01D 13/02
[52] U.S. Cl. ................................. 204/180 P; 204/301
[58] Field of Search .................. 204/180 P, 301, 98

[56] References Cited

U.S. PATENT DOCUMENTS

| | | | |
|---|---|---|---|
| 4,024,043 | 5/1977 | Dege et al. | 204/180 P |
| 4,082,835 | 4/1978 | Chlanda et al. | 204/180 P |
| 4,107,015 | 8/1978 | Chlanda et al. | 204/180 P |
| 4,116,889 | 9/1978 | Chlanda et al. | 204/180 P |
| 4,219,396 | 8/1980 | Gancy et al. | 204/180 P |
| 4,238,305 | 12/1980 | Gancy et al. | 204/180 P |

OTHER PUBLICATIONS

Desikan and Aravamuthan, *Chemical Abstracts*, vol. 50, 6221c (1956).
Richard M. Kramer, "Electrodialytic Concentration of Sulfuric Acid" University Microfilms, Inc., Ann Arbor, Michigan, (1964).
P. S. Desikan et al., Bull. Central Electrochem. Research Institute, Karaikudi 2, No. 2, 50–58 (1955) [C.A. 50, 6221c (1956)].

*Primary Examiner*—John F. Niebling
*Assistant Examiner*—B. J. Boggs, Jr.
*Attorney, Agent, or Firm*—Gus T. Hampilos; Gerhard H. Fuchs

[57] ABSTRACT

A process and apparatus for converting alkali metal sulfate values, such as sodium or potassium sulfate values in spent rayon spin bath liquors, into alkali metal hydroxide and alkali metal sulfate/sulfuric acid by using two- or three-compartment electrodialytic water splitter cells. The process and apparatus incorporate the features of: (a) feeding a liquid comprising water to the base compartment of an electrodialytic water splitter, (b) feeding a liquid comprising alkali metal sulfate values to the remaining compartments of the electrodialytic water splitter (c) passing current through said electrodialytic water splitter to produce liquid comprising alkali metal sulfate and sulfuric acid in one of the remaining compartments and a liquid comprising alkali metal hydroxide in said base compartment. The liquid fed to the acid compartments of two- and three-compartment cells may contain $H_2SO_4$. When more than about 5 weight percent $H_2SO_4$ is present in the alkali metal sulfate solution use of a three-compartment water splitter is preferred. Improved results are obtained when the compartments of the two- and three-compartment water splitter are maintained at a temperature of at least 40° C.

29 Claims, 9 Drawing Figures

ELECTRODIALYTIC WATER SPLITTING PROCESS AND APPARATUS FOR CONVERSION OF ALKALI METAL SULFATE VALUES DERIVED FROM SPENT RAYON SPIN BATHS

DESCRIPTION

CROSS-REFERENCE TO RELATED APPLICATION

This Application is a continuation-in-part of U.S. patent application Ser. No. 383,879, filed June 1, 1982 now abandoned.

BACKGROUND OF THE INVENTION

This invention relates to processes for converting alkali metal sulfate values, especially sodium or potassium sulfate, into alkali metal hydroxide and alkali metal sulfate/sulfuric acid by electrodialytic water splitting. Electrodialytic water splitting of aqueous neutral salts, in two-compartment cells, to form the corresponding acid and base is disclosed in C.A., Vol. 53, 11070b (1959) (Oda et al.). Additionally electrodialytic water splitting processes, in two-compartment bioplar membrane cells, to convert waste sulfate containing streams are disclosed in U.S. Pat. Nos. 4,082,835 and 4,107,015 (Chlanda et al.)

Rayon preparation is a well-developed technology which employs alkali metal sulfates in the preparation process. See for example, R. L. Mitch et al. "Rayon" in *Encyclopedia of Polymer Science and Technology*, Vol. 79, Intersciences Publishers (Div. of J. Wiley) 1969, pp. 810–847. Regeneration of alkali metal sulfate values, especially as $Na_2SO_4/H_2SO_4$, or $K_2SO_4/H_2SO_4$, from spent rayon spin baths is an energy intensive process requiring purification steps and make-up sulfuric acid. Due to increasing energy costs, an improvement in the efficiency of processes for regenerating of alkali metal sulfate values derived from rayon spin baths would be beneficial.

Accordingly, it is an object of the present invention to provide electrodialytic water splitting processes for converting aqueous alkali metal sulfate values contained in or obtained from rayon spin bath liquors into alkali metal hydroxide and alkali metal sulfate/sulfuric acid.

Other objects and advantages of the present invention will become apparent from the description which follows.

SUMMARY OF THE INVENTION

In accordance with the present invention, there is provided a process for converting alkali metal sulfate values contained in or obtained from spent rayon spin bath liquors into alkali metal hydroxide and alkali metal sulfate/sulfuric acid by using two- or three-compartment electrodialytic water splitters which comprises the steps of:

(a) feeding a liquid comprising water to a base compartment of each unit cell of an electrodialytic water splitter;

(b) feeding a liquid comprising spent rayon spin bath liquor containing alkali metal sulfate values to an acid compartment of each unit cell of the electrolydialytic water splitter;

(c) passing current through said electrodialytic water splitter to produce a reaction liquid comprising alkali metal sulfate/sulfuric acid for the acid compartment, of each unit cell of the electrodialytic water splitter, and a reaction liquid comprising alkali metal hydroxide in said base compartment of each unit cell of the electrodialytic water splitter.

In one embodiment of the present invention, a two-compartment unit cell electrodialytic water splitter comprising alternating acid and base compartments formed by alternating cation and bipolar membranes disposed between two electrodes is employed.

In another embodiment of the present invention, a three-compartment unit cell electrodialytic water splitter comprised of alternating base, acid, and salt compartments formed by alternating cation, bipolar, and anion membranes disposed between two electrodes is employed.

With the three-compartment electrodialytic water splitter, a reaction liquid comprising a reduced amount of alkali metal sulfate values as compared to the liquid fed to the remaining compartments is produced in the salt compartment.

BRIEF DESCRIPTION OF THE DRAWINGS

FIG. 7 graphically compares the overall current efficiency versus percent conversion for the two acid stage, two-compartment electrodialytic water splitter illustrated in FIG. 5 and for a prior art two-compartment electrodialytic water splitter of the type illustrated in FIG. 2a.

DETAILED DESCRIPTION OF THE INVENTION

The present invention provides electrodialytic water splitting processes that may be operated in two- or three-compartment unit cells to convert alkali metal sulfate values obtained from or contained in spent rayon spin baths into aqueous alkali metal hydroxide and alkali metal sulfate/sulfuric acid. Spent rayon spin bath liquors from rayon production, e.g., from the viscose process, normally contain at least about 5 weight percent up to saturation amounts of alkali metal sulfate, typically sodium or potassium sulfate, as well as organic and divalent metal cation impurities that result from spinning additives or modifiers added to produce higher rayon spinning speeds. While the present invention contemplates purifying the spent rayon bath liquors, such as by neutralization and filtration, to provide alkali metal sulfate substantially free of organic and divalent metal cation impurities, it is a special feature of the present invention that the spent rayon spin bath liquors may be directly fed to the electrodialytic water splitter without purification or pretreatment.

It is another special feature of the present invention that the electrodialytic water splitters operate with improved current efficiency by maintaining an average temperature for the liquids in the electrodialytic water splitter at a value of at least about 40° C., preferably at least about 45° C. and more preferably at least about 45° C., in each compartment of the water splitters. No upper limit in temperature, other than the decomposition temperature of the membranes or boiling points of the solutions, has been found.

Surprisingly, the improvement in current efficiency for the two- and three-compartment electrodialytic water splitters maintained at a temperature of at least about 40° C. is unique for aqueous alkali metal sulfate streams. Only a minor improvement in current efficiency was observed for electrodialytic water splitting of aqueous alkali metal chloride under similar operating conditions, e.g., current density, specific membranes, as the temperature of the electrodialytic water splitter was increased from about 30° to 45° C. (See FIG. 6).

Two-compartment electrolydialytic water splitters incorporate a plurality of cation and bipolar ion exchange membranes arranged in an alternating fashion between two electrodes thus forming an electrodialysis stack. The construction of electrodialysis stacks is well known and, for example, units are available commercially from Asahi Glass Co., 1-2, Marunochi 2-chome, Chiyoda-ku, Tokyo, Japan; Ionics, Inc., Watertown, Mass. and other commercial sources. In addition, the two-compartment water splitter used in the process of the present invention may be any of the devices described in U.S. Pat. No. 4,082,835 to Chlanda et al. (1979) for electrodialytic water splitting of sodium bisulfite and similar salts. The operation of the two-compartment water splitter is similar to that described in U.S. Pat. Nos. 4,082,835 and 4,107,015, with modifications in the feed solution composition as described hereinafter with reference to FIG. 2a.

The three compartment water splitter used in the process of the present invention incorporates a plurality of cation, bipolar and anion membranes arranged in an alternating fashion between two electrodes to provide alternating base, acid and salt compartments that form an electrodialytic stack. The operation of the three-compartment water splitter is further described hereafter with reference to FIG. 2b.

The two- and three-compartment electrodialytic water splitters employ bipolar membranes that can be of the type described, for example, in U.S. Pat. No. 2,829,095 to Oda et al. (which has reference to water splitting generally), in U.S. Pat. No. 4,024,043 (single film bipolar membrane), or in U.S. Pat. No. 4,116,889 (cast bipolar membrane).

The cation membranes useful in the process of the present invention may be weakly acidic or strongly acidic cation permselective membranes. Particularly useful cation membranes are Duponts Nafion ® acidic fluorocarbon membranes, especially Nafion ® 110, 901 and 324; but other commercially available cation membranes may be used.

Among the anion membranes found useful for the three-compartment unit cells are commercially available strongly, mildly or weakly basic anion permselective membranes such as are available from Ionics Inc., Watertown, Mass., and sold as Ionics 204-UZL-386, or from Asasi Glass Co. under the trade name Selemion ® AMV or ASV anion permselective membranes; but other commercially available anion membranes may be used.

Another novel feature of the present invention is feeding spent bath liquor obtained from rayon spin baths, without pretreatment to remove organic and divalent metal cation impurities, which comprise at least about 2 weight percent (normally 5 weight percent) up to saturation amounts of sodium or potassium sulfate, at least about 5 weight percent sulfuric acid, and organic and divalent metal ion impurities directly to the acid compartment of the three compartment water splitter. The pH of the solution fed to the water splitter is conveniently less than 7 and normally from about 1 to about 4. However, the precise pH of the solution fed is not critical. Furthermore, when more than about 5 weight percent sulfuric acid is present in the alkali metal sulfate solution, the use of the three-compartment water splitter is preferred. The usual concentration of alkali metal sulfate in the spent rayon spin bath liquors (feed solution) is from about 5 weight percent up to the saturation concentration of alkali metal sulfate. In addition, spent rayon spin bath liquors contain up to about 15 weight percent of sulfuric acid, preferably about 2-10 weight percent, and normally between about 6 and about 8 weight percent. Preferably, the feed solution is between about 10 weight percent (more preferably about 15 weight percent) and the saturation concentration (about 32 weight percent for sodium sulfate) of alkali metal sulfate. The acidified salt solution (reaction liquid) produced in the electrodialytic water splitter and recycled to a rayon spin bath contains alkali metal sulfate and an enriched amount of sulfuric compared to the feed solution. Typically, the concentration of $H_2SO_4$ in the reaction liquid is between about 8 and 14 weight percent, preferably 9-12 weight percent.

When a three-compartment electrodialytic water splitter is employed in our process the solution fed to the salt compartments can be alkali metal sulfate valuecontaining spent rayon spin bath liquor which has been purified by standard procedures to remove organic impurities and divalent metal impurities (e.g., $Ca^{+2}$, $Mg^{+2}$, $Zn^{+2}$, etc) that can migrate through and/or clog the cation membrane.

The concentration of alkali metal sulfate in the feed solution to the salt compartment of the three-compartment cell may be as low as 5 weight percent up to saturation amounts in the alkali metal sulfate. However, about a 15-32 weight percent alkali metal sulfate feed solution is preferred. The pH of the salt feed solution is not critical, but preferably is about seven. A particularly convenient feed for the salt compartment of the three-compartment electrodialytic water splitter is an aqueous solution formed from crystallized glauber salt ($Na_2SO_4.10H_2O$) which is obtained as a by product from spent rayon spin bath liquors.

The solution fed to the acid compartment of a two-compartment water splitter may contain from about 15 to about 32 weight percent alkali metal sulfate values. Typically, about 30 weight percent sodium sulfate solution containing about 0 to about 5 weight percent sulfuric acid and derived from pretreated spent rayon spin bath liquor (such as by forming an aqueous solution of glauber salt derived from the spent rayon spin bath liquors) is fed to the acid compartment of the two-compartment cell.

The liquid fed to the base compartments of the electrodialytic water splitters may be water alone, or it may be water containing any of a variety of electrolytes. Preferably, this liquid is neutral or basic (pH 7-14). More preferably, it is aqueous sodium hydroxide of a concentration between about 1 and about 50 weight percent (preferably between about 5 and about 25 weight percent). (The actual feed concentration to the base compartments is normally at least about 5 weight percent NaOH. This concentration may be achieved by recycling, staging or a combination thereof as described in more detail below.

The current passed through the water splitter in conventional fashion is direct current of a voltage dictated by design and performance characteristics readily apparent to the skilled artisan and/or determined by routine experimentation. Generally, current densities in the range of about 50-150 mamp/cm$^2$ are used. Current densities of about 100-150 mamp/cm$^2$ are normally employed.

Figure 3:
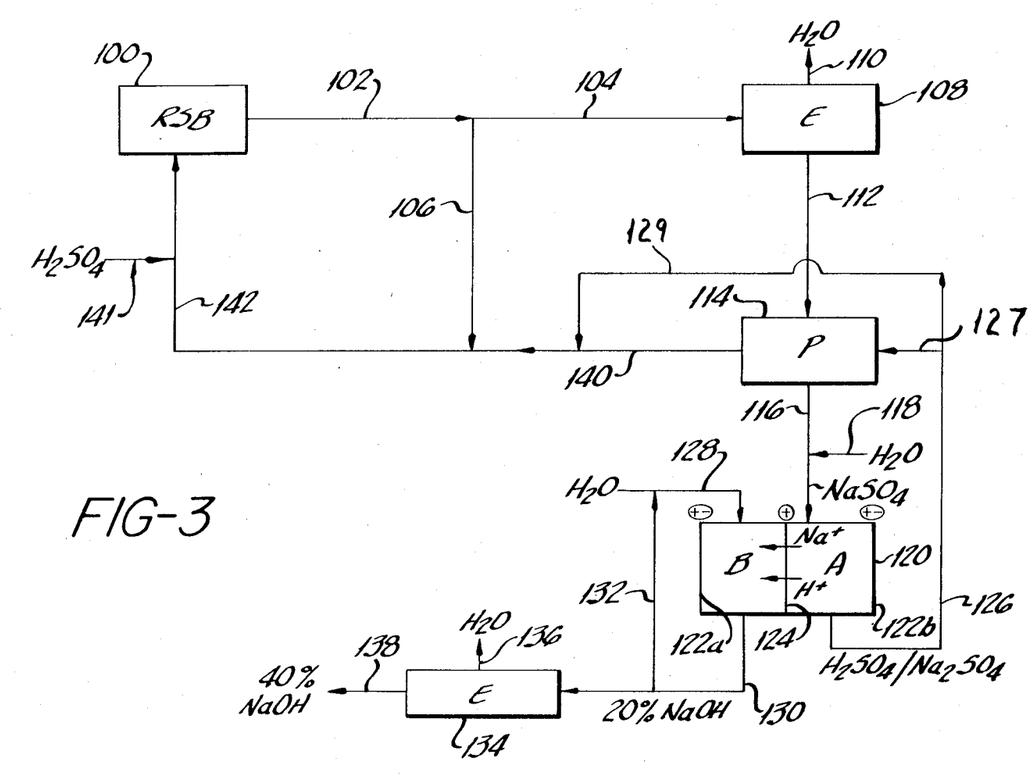
FIG. 3 illustrates schematically a preferred embodiment of the present invention using a two-compartment electrodialytic water splitter.

FIG. 3 schematically illustrates a preferred embodiment of the process of the present invention practiced in a two-compartment electrodialytic water splitter. Aqueous alkali metal sulfate value-containing spent rayon spin bath liquor is removed from rayon spin bath 100 via line 102. At least a portion of the sodium sulfate values in line 102 is forwarded via line 104 to an evaporator 108 for water removal. Water is removed via line 110 and concentrated sodium sulfate/sulfuric acid, typically about 10-32 weight percent sodium sulfate, and 0-15 weight percent sulfuric acid is removed from evaporator 108 via line 112 to purification zone 114 for removal of organic impurities and divalent metal cations which may interfere with the operation of the electrodialytic water splitter 120. Although the purification step may be pH adjustment and filtration or ion exchange, purification typically involves an evaporative crystallization to form glauber salt ($Na_2SO_4.10H_2O$) and a mother liquor enriched in sulfuric acid and depleted in sodium sulfate. The glauber salt is removed via line 11b. The mother liquor is removed via a line 140 and returned to the spin bath 100 a line 142. Sulfuric acid may be added via line 141 to the mother liquor in line 142 when make-up sulfuric acid is required, and a portion of the spent rayon spin bath liquor in 102 is forwarded via line 106 for combination with the sodium sulfate-depleted, sulfuric acid-enriched mother liquor removed from purification zone 114. Water is added to the glauber salt in line 116 via line 118 in an amount sufficient to form an aqueous solution typically containing about 15 up to the saturation amount of sodium sulfate. The aqueous sodium sulfate solution in line 116 is fed to an acid compartment A of the two-compartment electrodialytic water splitter 120. The two-compartment electrodialytic water splitter consists of a plurality of unit cells each comprised of at least one bipolar membrane 122a and one cation permselective membrane 124 (as shown in this figure, the unit cell includes two bipolar membranes 122a) thereby forming alternating base and acid compartments positioned between two electrodes. Under direct current, the sodium sulfate in the acid compartment A is enriched in sulfuric acid by hydrogen ions generated at the cation face of bipolar membrane 122a. Sodium cations and small amounts of hydrogen ions migrate from acid compartment A through cation permselective membrane 124 into the base compartment B. A sodium sulfate solution enriched in sulfuric acid (between about 5 to 15 weight percent sulfuric acid typically 8-14 weight percent and preferably about 9-12 weight percent) is removed from acid compartment A via line 126 and forwarded via a line 127 to purification zone 114 for additional glauber's salt removal or, forwarded via a line 129 to and 142 for return to spin bath 100 line 140. In the base compartment B, water is supplied by a line 128. Hydroxide ions generated at the anion face of the bipolar membrane 122a combine with the sodium ions that migrate from the acid comartment through cation membrane 124 to form aqueous sodium hydroxide, typically containing about 10-20 weight percent sodium hydroxide, which is removed from the base compartment B via line 130. A portion of the sodium hydroxide in line 130 may be recycled to line 128 via line 132. Another portion of the sodium hydroxide in line 130 may be fed to evaporator 134 for concentration to 40 to 50 weight percent sodium hydroxide. The concentrated hydroxide then is removed via line 138. Normally, the concentration of the sodium hydroxide removed from the base compartment B is suitable for dissolving cellulous material used in rayon production.

Figure 4:
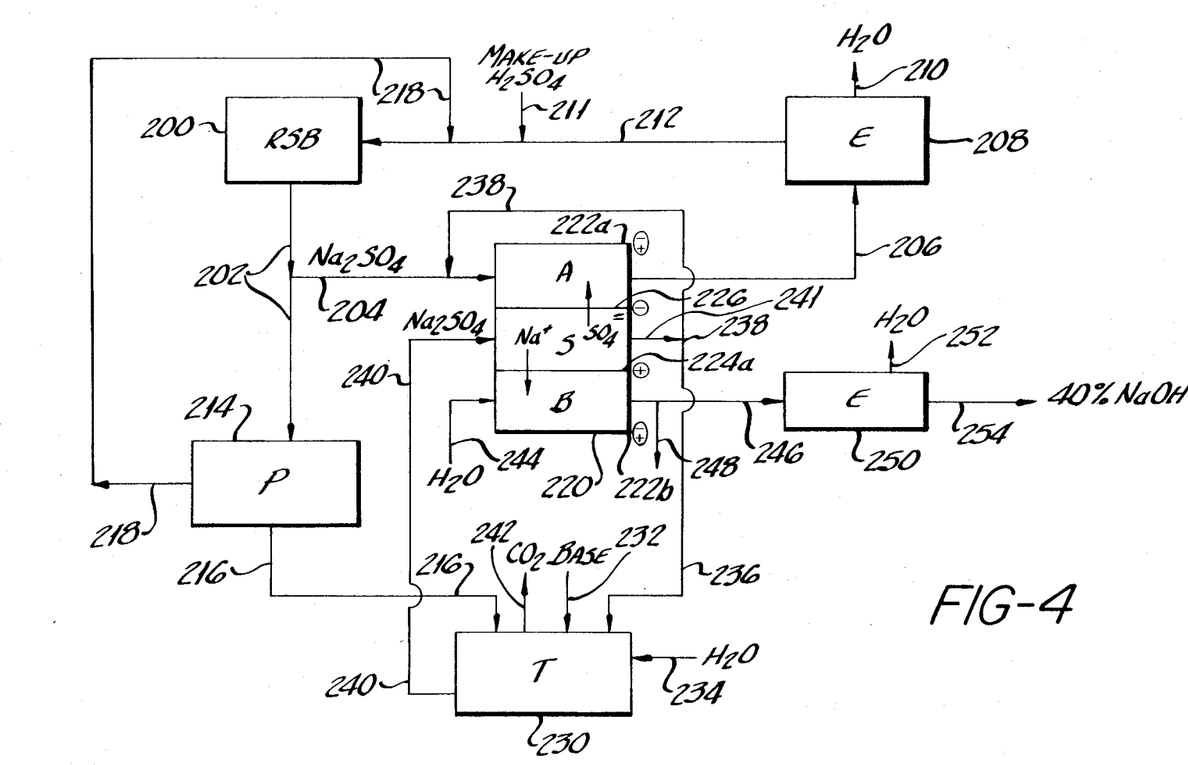
FIG. 4 illustrates schematically an embodiment of the present invention using a three-compartment electrodialytic water splitter.

FIG. 4 schematically illustrates another embodiment of the present invention which employs a three-compartment electrodialytic water splitter. Spent rayon spin bath liquor is removed from rayon spin bath 200 via line 202. At least a portion of the spent rayon spin bath liquor in line 202 is forwarded via line 204 to the acid compartment A of the three-compartment electrodialytic water splitter 220. The three compartment electrodialytic water splitter has unit cells defined by four membranes, including two bipolar membranes 222a, an ion permselective membranes 226 and a cation permselective membrane 224a which form acid A, salt S, and base B compartments. In acid compartment A, sulfate ions migrate from the salt compartments S into the acid compartment A and therein combine with hydrogen ions generated at the cation face of bipolar membrane 222a. An aqueous sodium sulfate solution, enriched in sulfuric acid, is removed from the acid compartment A via line 206 and forwarded to evaporator 208 for removal of water via line 210. It is to be understood that the evaporation step may be omitted if not required to adjust the water balance in the system. If evaporator 208 is used, a more concentrated sodium sulfate/sulfuric acid solution is removed via line 212 and forwarded to the rayon spin bath 200. The remainder of the spent rayon spin bath liquor in line 202 is fed to purification zone 214 for removal of organic and divalent metal cation impurities. Typically an evaporative crystallization is performed in purification zone 214 to form glauber salt and a mother liquid enriched in sulfuric acid and depleted in sodium sulfate. The glauber salt is removed via a line 216 and the mother liquor is removed via line 218 by line 212 to the rayon spin bath 200. The glauber salt in line 216 is forwarded to the salt compartment recycle tank 230 in the form of a solid, a slurry or an aqueous solution. To the salt recycle tank 230 an alkali metal base (typically soda ash or sodium hydroxide) is added via line 232 and at least a portion of the sodium sulfate solution removed from salt compartment S (which may optionally contain sulfuric acid) is added via line 236 to recycle tank 230. Make-up water, if necessary, is added to tank 230 via line 234. The alkali metal base added via line 232 may be subjected to additional purification, for example, to remove divalent cations. An aqueous solution of sodium sulfate, containing about 10 weight percent up to the saturation amount (typically about 15 weight percent up to the saturation amount) of sodium sulfate and insolubles, is removed from recycle tank 230 via line 240, filtered (not shown) and forwarded to salt compartment S. In salt compartment S, sodium cations migrate through the cation permselective membrane 224a from salt compartment S into base compartment B and sulfate ions migrate from salt compartment S through anion permselective membrane 226 to acid compartment A. An aqueous sodium sulfate solution containing a reduced amount of sodium sulfate is removed from salt compartment S via line 241. The pH of the sodium sulfate solution in line 241 may be acidic, basic, or neutral. When the sodium sulfate solution in line 241 is acidic, at least a portion may be forwarded via line 238 to the acid compartment A via line 204. The remainder of the acidic sodium sulfate solution in line 241 may be forwarded via line 236 to recycle tank 230.

Water is fed from line 244 to the base compartment B. In the case compartment B, sodium ions that migrate from the salt compartments through the cation permselective membrane 224a combine with hydroxide ions introduced at the anion face of bipolar membrane 222b to form aqueous sodium hydroxide, typically containing about 10–20 weight percent sodium hydroxide, which is removed from base compartment B via line 246. The composition of the sodium hydroxide solution removed from base compartment B is already suitable for dissolving, cellulous material used in rayon production A portion of the sodium hydroxide solution in line 246 may be removed via line 248 for supply to the recycle tank 230 via line 236 and the remainder is forwarded via line 246 to evaporator 250 for removal of water via line 252 and formation of a 40 to 50 weight percent sodium hydroxide solution.

Figure 2A:
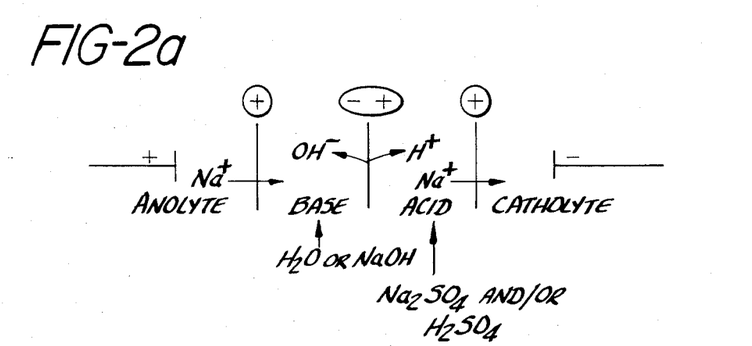
FIG. 2a illustrates schematically the ion transfer in a two-compartment bipolar membrane water splitter.

As described hereinabove, the present invention may be conveniently operated with a two- or three-compartment electrodialytic water splitter. If the two-compartment electrodialytic water splitter is to be employed, one of the two-compartment electrodialytic water splitters illustrated in FIGS. 2a, 2c, or 5 may be employed. The two-compartment electrodialytic water splitter illustrated in FIG. 2a is generally sufficient under normal conditions; that is, for producing less than about a 25–50% conversion of alkali metal sulfate [for example, 1 molar $Na_2SO_4$ sulfate into 0.25–0.50 molar $NaHSO_4$ (represented also as alkali metal sulfate/$H_2SO_4$) and 0.75–0.50 molar $Na_2SO_4$]. For higher conversions, that is conversions above about 25–50%, it may be advisable to use one of the alternative embodiments of the two-compartment water splitter illustrated in FIGS. 2c and 5.

Figure 2B:
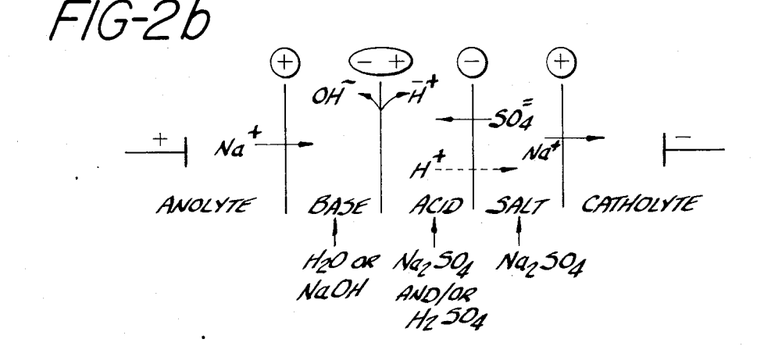
FIG. 2b illustrates schematically the ion transfer in a three-compartment bipolar membrane water splitter.
Figure 2C:
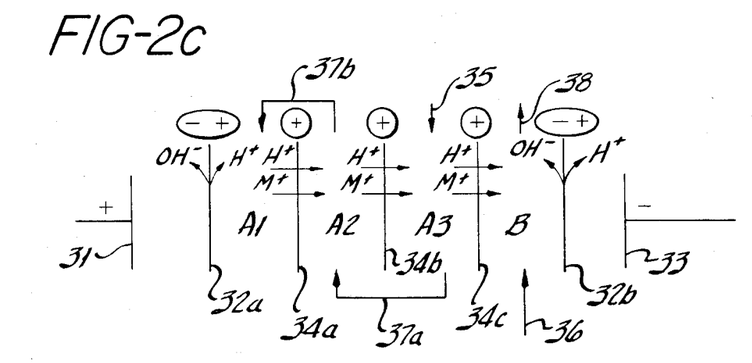
FIG. 2c illustrates schematically a preferred embodiment of the present invention using a three acid stage, two-compartment electrodialytic water splitter.

The three acid stage two-compartment electrodialytic water splitter illustrated in FIG. 2c incorporates a plurality of unit cells such comprised of one bipolar membrane, 32a, two substantially non-porous, water-swollen cation or neutral membranes 34a, 34b, and a cation permselective membrane 34c, thereby forming first acid compartment $A_1$, second acid compartment $A_2$, and third acid compartment $A_3$ base compartment B arranged in the illustrated fashion between two electrodes, anode 31 and cathode 33. A direct current is passed from the anode 31 to the cathode 33. Aqueous alkali metal sulfate solution in line 35 and containing, for example, sodium sulfate is fed to a third acid compartment $A_3$. Hydrogen ions which are introduced at the cation face of bipolar membrane 32a migrate through membranes 34a, 34b, and 34c into base compartment B and, at the same time, alkali metal cations (e.g., sodium) in acid compartment $A_3$ migrate through cation membrane 34c into base compartment B. The aqueous sodium sulfate solution from $A_3$ which may be acidic, neutral, or basic (preferably acidic) is removed therefrom via line 37a and transferred to second acid compartment $A_2$. Hydrogen ions and sodium cations in $A_2$ migrate through cation or neutral membrane 34b into third acid compartment $A_3$. The aqueous sodium sulfate solution in $A_2$ which may be neutral or acidic (preferably acidic) is removed via line 37b and fed to acid compartment $A_1$. Hydrogen ions generated at bipolar membrane 32a are added to the aqueous sodium solution in $A_1$ and an acidified aqueous solution of sodium sulfate and sulfuric acid is withdrawn from $A_1$ via line 39a. In addition, hydrogen ions and sodium ions in $A_1$ migrate through cation or neutral membrane 32a into the second acid compartment $A_2$. By employing serially connected intermediate acid compartments $A_1$, $A_2$, and $A_3$, the third acid compartment $A_3$, nearest the anion face of bipolar membrane 32b, contains the lowest acid concentration and the first acid compartment $A_1$, nearest the cation face of bipolar membrane 32a contains the highest acid concentration. To the base compartment B, a liquid comprising water, preferably also comprising dilute alkali metal hydroxide, is fed via line 36. Hydroxide ions generated at the anion face of bipolar membrane 32b are added to produce an enriched aqueous alkali metal hydroxide. The aqueous alkali metal hydroxide enriched solution is removed from the base compartment B via line 38. This arrangement improves the efficiency for acid and base generation over prior art two-compartment water splitter designs such as illustrated in FIG. 2a by decreasing the amount of migration of hydrogen ions into the base compartment, thus increasing the efficiency of producing hydrogen ions and hydroxide ions.

With the multi-acid compartment two-compartment electrodialytic water splitter, it is contemplated that the flow rates out of the different compartments may be the same or different. In particular, the flow rates or the new flow rates after recycle out of the base compartments may be considerably slower than that out of the acid compartments such that the hydroxide ion concentration in the product withdrawn from compartment B is substantially greater than the acid concentration in the acidified aqueous salt solution withdrawn from $A_1$. Alternatively the flow rates may be adjusted such that the acid concentration in the product aqueous salt withdrawn from $A_1$ is greater than the hydroxide ion concentration in the product removed from the base compartment B.

The additional membranes 34a and 34b positioned between cation faces of the bipolar membranes 32a and the cation membrane 34c thereby forming at least two acid compartments may be cation permselective or neutral membranes but must be are substantially non-porous (to water) water-swollen. By the term "substantially non-porous (to water)" as used herein in reference to membranes is meant a membrane having a water or hydraulic permeability of no more than about 1 mL of water/$dm^2$ of membrane area per hour at 1 meter of water pressure. Lower values of hydraullic permeability, such as $1 \times 10^{-1}$ mL/$dm^2$ per hour at 1 meter of water pressure are preferred. However, no lower limit for hydraulic permeability has been found critical to the operation of the present invention so long as the additional substantially non-porous, water-swollen cation membrane allows transport therethrough of water molecules accompanying ions under the influence of applied direct current. Use of membranes having values of hydraulic permeability greater than about 1 mL/dm$^2$ per hour at 1 m of water pressure are to be avoided. By the term "water-swollen" as used herein reference to membranes, is meant a water-insoluble, bibulous membrane. In addition the membranes 34$a$ and 34$b$ separating A$_1$/A$_2$ and A$_2$/A$_3$ may be low resistance, weak, mildly acidic or strongly acid cation membranes such as described in reference to FIGS. 1, 2$a$, and 2$b$ hereinbelow or may even be uncharged membranes. These uncharged or neutral membranes are those which are non-ion selective (i.e., anion and cation-permeable, non-porous but water-swollen). Suitable uncharged membranes may be prepared by interpolymerizing a difunctional vinyl monomer, e.g., divinyl benzene with a non-ionic hydrophilic monomer, e.g., acrylamine.

The number of stages that may be incorporated into the acid compartment is not critical and may be varied from at least two up to about ten, as long as the solution of lowest acidity enters the acid compartment closest to the cathode and flows serially to the acid compartment closest to the anode, wherein a solution of highest acidity is produced.

Figure 5:
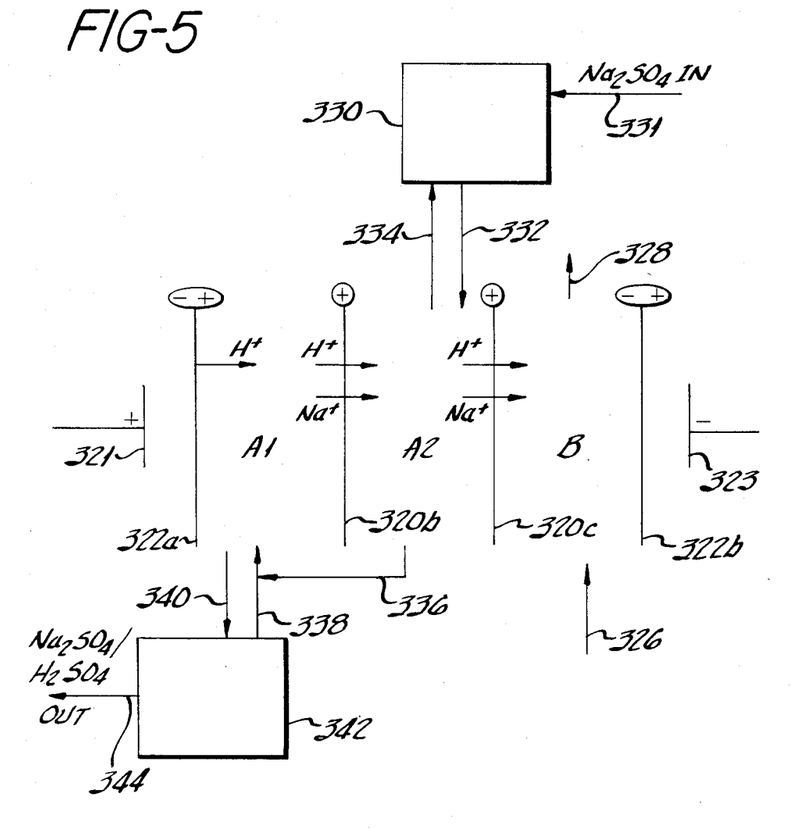
FIG. 5 illustrates schematically another preferred embodiment of the present invention which employs a two-acid stage, two-compartment electrodialytic water splitter.

FIG. 5 illustrates another embodiment of the present invention employing a two acid stage two-compartment electrodialytic water splitter for production of acidified aqueous sodium sulfate. Aqueous sodium sulfate containing solution is fed via line 331 to tank 330 and subsequently via line 332 to acid compartment A$_2$ formed by a face of a substantially non-porous, water-swollen cation or neutral membrane 320$b$ and a face of a cation permselective membrane 320$c$. Under the influence of direct current applied through anode 321 toward cathode 323, hydrogen ions and sodium ions migrate through cation permselective membrane 320$c$ into base compartment B. Some acidified aqueous sodium sulfate solution produced in acid compartment A$_2$ is removed via line 334 and recycled to tank 330. At least a portion of the acidified sodium sulfate solution from A$_2$ is removed via line 336 and supplied to line 338 which in turn feeds first acid compartment A$_1$ formed by a cation face of bipolar membrane 322$a$ and a face of the substantially non-porous, water-swollen cation or neutral membrane 320$b$. The acidified sodium sulfate solution is removed from first acid compartment A$_1$ via line 340 to tank 342. At least a portion of the acidified aqueous sodium sulfate solution is removed form tank 342 via line 344. The operation of the base compartment in FIG. 5 is analogous to that of the base compartment in FIGS. 2$a$ and 3.

The average temperature in the two-compartment cell may be maintained at a value of at least about 40° C. by any conventional means which is considered within the skill in the art. It is more preferable to maintain the temperature of the solution in each compartment of the two-compartment water splitter at a value of at least about 40° C. and still more preferable at a value of at least about 45° C. The temperature maintained in the three-compartment cell is not critical to operation of the invention but normally is about 35° to about 55° C. As noted heretofore, unique results are obtained when the feed solution is an alkali metal sulfate and the temperature of the solution is maintained at a value of at least 40° C.

GENERAL EXPERIMENTAL

A procedure for determining efficiency is best described by reference to FIG. 1 which illustrates the laboratory apparatus used. FIG. 2$b$ schematically represents the major transport processes which occur in the three-compartment electrodialytic water splitter unit cell illustrated in FIG. 1. The electrodialytic water splitter consists of a cylindrical cell constructed of fluorocarbon polymer. The cell is equipped at each end with platinum electrodes 6 and 7 connected to a DC power source. Five compartments separated by membranes were contained in the cell. These compartments were anolyte 1, base 2, acid 3, salt 4, catholyte 5. These compartments were separated by ion exchange membranes with an exposed area of 11 cm$^2$ as follows: 8 and 11 were Nafion ® 110 membranes manufactured by DuPont; 9 was a bipolar membrane prepared in accordance with U.S. Pat. No. 4,116,889; and anion exchange membrane 10 was a commercially available anion membrane manufactured by Ionics Inc. 204-UZL-386. Pumps 15, 16 and 17 were used to circulate solutions through the cell. The anolyte/catholyte reservoir 12 was charged with 1 L of 0.5M Na$_2$SO$_4$ before the experiment. This solution was circulated to the anolyte compartment as stream 26 and returned to the reservoir via line 29 and to the catholyte compartment as stream 27 and returned to the reservoir via line 30. The base and salt compartments 2 and 4 were fed from reservoir 14 by streams 35 and 36 and the solution was returned to the reservoir via lines 24 and 25. Solution was circulated through the acid compartment 3 by means of pump 17. The acid stream did not contain a reservoir, the charge consisting of only the solution in the compartment, pump and associated tubing. At the highest point of the acid loop an overflow tube 20 was placed. During the experiment, solution was introduced into the acid loop at a controlled rate by metering pump 18 from reservoir 13. The introduction of solution in this way and mass transport through the membranes caused an overflow from the acid compartment which was collected externally.

As shown in FIG. 2$b$, when a direct current was passed through the cell, H$^+$ and OH$^-$ ions were produced by the bipolar membrane. The OH$^-$ ions were introduced into the base compartment and the H$^+$ ions into the acid compartment. Sulfate ions entered the acid compartment through the anion membrane causing a net formation of sulfuric acid in the acid compartment. Since the anion membrane was not perfectly selective to anions, especially at high acid concentrations, some of the H$^+$ produced in the acid was lost by migration to the salt compartment.

Since the outputs from the salt and base compartments were combined in the experimental apparatus, the net H$^+$ production may be monitored by observing the net OH$^-$ production in the base/salt streams. The production of acid may also be monitored by the analysis of the overflow from the cell and the rate and composition of the solution metered to the cell.

EXPERIMENT 1

Figure 1:
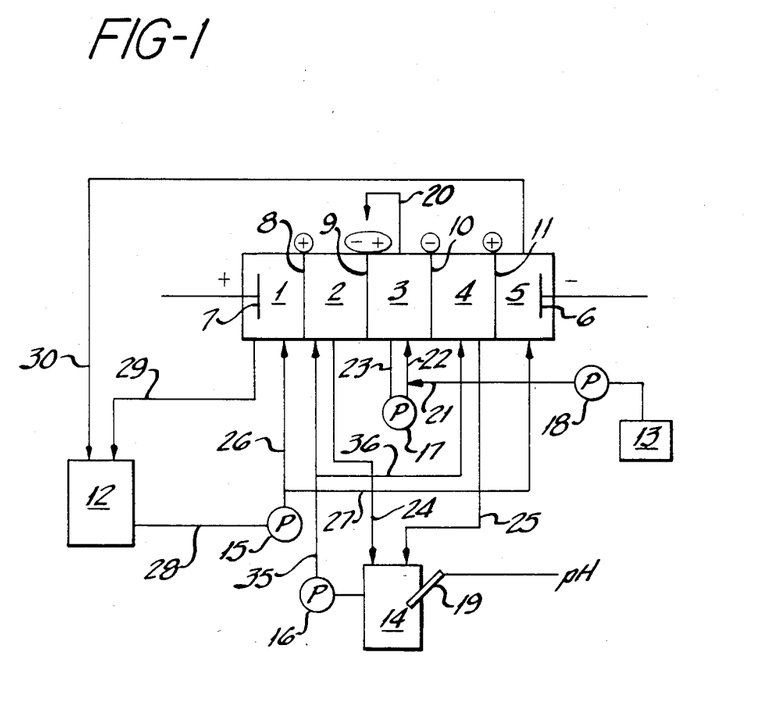
FIG. 1 illustrates schematically a three-compartment water splitter wherein the operation of the process of the broadest aspect of the present invention was tested.

The apparatus illustrated in FIGS. 1 and 2$b$ including the membranes described in GENERAL EXPERIMENTAL was used. The electrolyte reservoir 12 was charged with 1 L of 0.5M Na$_2$SO$_4$ and the base/salt reservoir 14 with 1.8 L of 1M $Na_2SO_4$. A heater, pH probe, and thermometer were placed in the base/salt reservoir. The base/salt solution was warmed by means of the heater and maintained at approximately 33° C. throughout the experiment. The acid loop was charged with about 35 g of a solution (X) of about 2.0% $H_2SO_4$. Water was metered to the acid loop at a rate of 7.0 g/1000 seconds. The base/salt reservoir was brought to pH 4 by adding a small amount of 1.015N $H_2SO_4$ and a current of 1.20 amps was applied. The base/salt reservoir pH increased as $OH^-$ was introduced. When the pH reached 7, a timer was started and a tared container was placed to collect the overflow from the acid compartment. This container was replaced at 1000 second intervals with a new container and the contents of the container analyzed for sulfuric acid by titration with standard 1N NaOH. About 300 seconds after the timer was started, 5.0 mL of 1.015N $N_2SO_4$ was added to the base/salt reservoir. This caused the pH to decrease to about 4. As the experiment continued, the pH rose due to $OH^{-1}$ formation. The time at which pH 7 was reached was recorded. The efficiency for base (and therefore acid production) is calculated from the time interval between successive pH readings and the known amount of acid added during the interval by the following formula:

Current efficiency =

$$\frac{mL\ acid \times normality \times 96.5\ (coul/meq)}{\frac{current\ (amps)}{time\ interval\ (sec)}}$$

The experiment was continued for 6000 seconds with the acid collecting cups changed every 1000 seconds and 5.0 mL aliquots of 1.067N $H_2SO_4$ were added to the base/salt reservoir about 300 seconds after the pH had reached 7. The results are shown in Table I. The current efficiency was also calculated on the basis of the change in concentration of acid over the interval, the weight and concentration collected. Based on these results, the current efficiency was 0.77 at 1000 seconds, 0.69 at 3000 seconds and 0.68 at 5000 seconds. These efficiencies agree well with the base efficiencies as determined by the time intervals in view of the difficulties in determining the flows, concentrations and volumes of the acid loop. The results are reported in Table I.

TABLE I

| Avg Time (Sec) | $Ta^1$ | $Tbs^2$ | Avg Temp (°C.) | Current Efficiency | % $H_2SO_4$ |
|---|---|---|---|---|---|
| 0 | 34.6 | 34.7 | — | — | — |
| 535 | 33.8 | 34.3 | 34.4 | 0.802 | 1.45 |
| 1089 | 33.3 | 33.9 | 33.8 | 0.774 | 2.00 |
| 1663 | 33.0 | 33.8 | 33.5 | 0.747 | 2.50 |
| 2250 | 33.0 | 33.6 | 33.4 | 0.731 | 2.95 |
| 2859 | 33.0 | 33.5 | 33.3 | 0.704 | 3.30 |
| 3482 | 32.9 | 33.4 | 33.2 | 0.689 | 3.64 |
| 4125 | 33.8 | 33.5 | 33.2 | 0.667 | 3.90 |
| 4773 | 32.8 | 33.3 | 33.1 | 0.662 | 4.15 |
| 5436 | 32.5 | 33.2 | 33.0 | 0.647 | 4.35 |
| 6107 | 32.4 | 33.1 | 32.8 | 0.639 | 4.45 |

Footnotes
[1]Ta is temperature in °C. in acid compartment
[2]Tbs is temperature in °C. in base and salt compartments

EXPERIMENT 2

Experiment 2 was run in a manner identical to experiment 1 except that the average temperature was about 43° C., about 10° C. higher than in Experiment 1. The results are shown in Table II. Comparison of Experiments 1 and 2 show that 10° change in temperature may have beneficial effects on the current efficiency.

TABLE II

| Avg Time (Sec) | $Ta^1$ | $Tbs^2$ | Avg Temp (°C.) | Current Efficiency | % $H_2SO_4$ |
|---|---|---|---|---|---|
| 0 | 39.6 | 44.3 | — | — | — |
| 506 | 39.3 | 44.1 | 41.8 | 0.848 | .75 |
| 1019 | 39.5 | 44.3 | 41.8 | 0.836 | 1.25 |
| 1550 | 39.8 | 44.5 | 42.0 | 0.808 | 1.75 |
| 2096 | 39.9 | 44.6 | 42.2 | 0.786 | 2.18 |
| 2653 | 40.0 | 45.0 | 42.4 | 0.770 | 2.57 |
| 3218 | 40.1 | 45.2 | 42.6 | 0.759 | 2.92 |
| 3790 | 40.2 | 45.5 | 42.8 | 0.750 | 4.18 |
| 4350 | 40.3 | 45.6 | 42.9 | 0.766 | 4.42 |
| 4973 | 40.4 | 45.8 | 43.0 | 0.689 | 4.63 |
| 5564 | 40.6 | 46.0 | 43.2 | 0.726 | 4.80 |
| 6164 | 40.8 | 46.1 | 43.4 | 0.715 | 4.92 |

Footnotes
[1]Ta is temperature in °C. in acid compartment
[2]Tbs is temperature in °C. in base and salt compartments

EXPERIMENT 3

Experiment 3 was run in the cell and in a manner similar to that described in Experiment 1, except 400 mL of 0.5M $Na_2SO_4$ was charged to base/salt reservoir and the solutions from reservoirs 13 and 14 were recirculated (instead of metering in and withdrawing from the cell). The temperature was increased during the experiment. The results are summarized in Table III and shown graphically in FIG. 6.

TABLE III

| Avg Time (Sec) | $Ta^1$ | $Tbs^2$ | Avg Temp (°C.)$^3$ | Current Efficiency | % $H_2SO_4$ |
|---|---|---|---|---|---|
| 0 | 26.7 | 27.0 | — | — | .02 |
| 759 | 33.5 | 33.0 | 30.0 | 0.538 | .04 |
| 1444 | 39.0 | 38.0 | 35.9 | 0.596 | .06 |
| 2102 | 38.7 | 38.0 | 38.4 | 0.620 | .08 |
| 2756 | 39.8 | 39.0 | 38.9 | 0.624 | .09 |
| 3399 | 41.3 | 40.4 | 40.1 | 0.635 | .11 |
| 4029 | 42.3 | 41.2 | 41.3 | 0.648 | .13 |
| 4652 | 43.0 | 42.0 | 42.1 | 0.655 | .14 |
| 5269 | 43.6 | 42.8 | 42.9 | 0.662 | .16 |
| 5883 | 44.2 | 43.0 | 43.4 | 0.665 | .17 |
| 7107 | 44.9 | 43.9 | 44.0 | 0.667 | .21 |
| 7712 | 45.6 | 44.2 | 44.7 | 0.675 | .22 |
| 8306 | 46.7 | 45.3 | 45.5 | 0.687 | .24 |
| 8898 | 47.2 | 45.8 | 46.3 | 0.689 | .25 |
| 9484 | 47.4 | 46.0 | 46.6 | 0.696 | .27 |

Footnotes
[1]Ta is temperature in °C. in acid compartment
[2]Tbs is temperature in °C. in base and salt compartments
[3]Average temperature in cell

EXPERIMENT 4

Experiment 4 was run in a manner similar to that described in Experiment 3, except that sulfate solutions in the acid, base and salt reservoirs were replaced with 2.9 weight percent HCl and 1M NaCl, respectively and 1.000N HCl was added to the base salt reservoir. The results are summarized in Table IV and are also shown graphically in FIG. 6.

Figure 6:
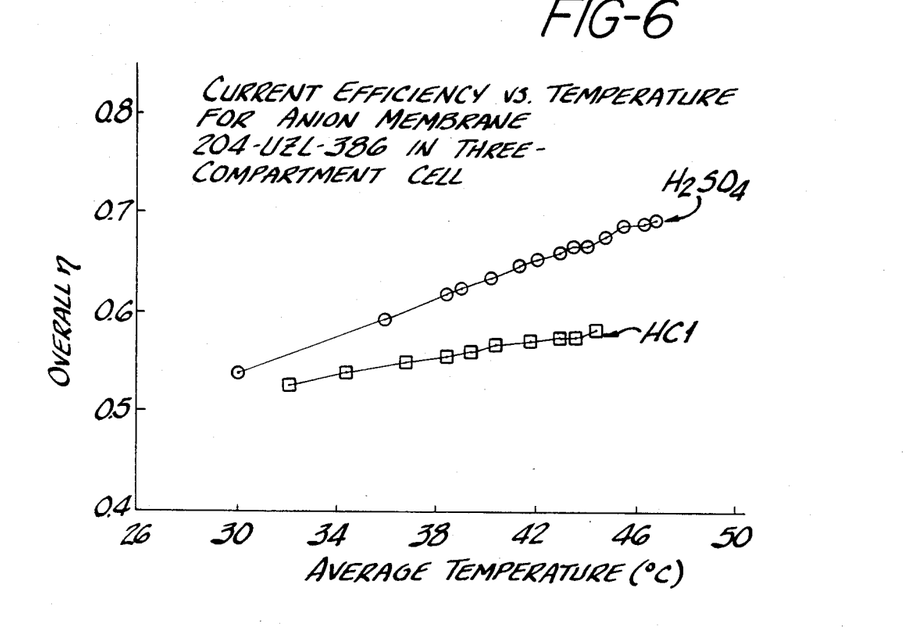
FIG. 6 graphically depicts the improvement in current efficiency for electrodialytic water splitting of aqueous sulfate streams operated in accordance with the present invention as compared to the current efficiency for electrodialytic water splitting of aqueous chloride streams.

FIG. 6 demonstrates that while it is beneficial to raise the temperature in the sulfate system raising the temperature in the $Cl^-$ system has only a small effect that might be predicted by changes in $H^+$ and $Cl^-$ mobilities with temperature.

TABLE IV

| Avg Time (Sec) | $Ta^1$ | $Tbs^2$ | Avg Temp (°C.)$^3$ | Current Efficiency | % HCl |
|---|---|---|---|---|---|
| 1527 | 31.3 | 31.2 | — | — | 1.92 |

TABLE IV-continued

| Avg Time (Sec) | Ta[1] | Tbs[2] | Avg Temp (°C.)[3] | Current Efficiency | % HCl |
|---|---|---|---|---|---|
| 2292 | 33.0 | 32.8 | 32.1 | 0.526 | 2.93 |
| 3040 | 36.0 | 35.3 | 34.3 | 0.538 | 2.94 |
| 3770 | 38.3 | 37.3 | 36.7 | 0.551 | 2.95 |
| 4494 | 39.4 | 38.5 | 38.4 | 0.555 | 2.96 |
| 5211 | 40.3 | 39.2 | 39.4 | 0.561 | 2.98 |
| 5921 | 41.5 | 40.4 | 40.4 | 0.566 | 2.99 |
| 6624 | 42.7 | 42.2 | 41.7 | 0.572 | 3.00 |
| 8020 | 44.0 | 43.0 | 43.0 | 0.576 | 3.02 |
| 8718 | 44.3 | 43.0 | 43.6 | 0.576 | 3.03 |
| 9408 | 46.0 | 44.1 | 44.4 | 0.583 | 3.04 |

Footnotes
[1] Ta is temperature in °C. in Acid Compartment
[2] Tbs is temperature in °C. in Base and Salt Compartments
[3] Average Temperature in °C. in cell

EXPERIMENT 5

The efficiency of two compartment water splitting as a function of conversion of $Na_2SO_4$ and temperature was determined in apparatus similar to that shown in FIG. 1 except that membrane 10 was a cation membrane prepared from partially sulfonated polystyrene and the acid compartment 3 was supplied from a 2 L reservoir charged with $Na_2SO_4/H_2SO_4$ solution whose composition changed only slowly with time. The experiments were conducted at a current of 1.20 A. The efficiency for base generation was determined by adding known amounts of $H_2SO_4$ to the Base-Salt reservoir 14 and measuring the times needed for the added $H_2SO_4$ to be consumed. Since as the acidity in 3 is increased more $H^+$ is transported relative to $Na^+$ across cation membrane 10, the observed efficiency for base generation is therefore a measure of the relative transport of $H^+$ and $Na^+$ across cation membrane 10.

The results are shown in Tables Va–c. For the purposes of further calculations of system efficiencies the results have been fitted by the least squares method to quadratic equations as follows:
At 50° $\eta = 0.9634 - 0.0321\ C - 0.6499\ C^2$
At 45° $\eta = 0.9630 - 0.0374\ C - 0.5879 C^2$
At 35° $\eta = 0.9702 - 0.1601\ C - 0.5125 C^2$ The results show that especially at conversions above 0.5 an increased efficiency is observed at 45° and 50° compared to 35°. Similar results are expected with other cation membranes.

TABLE Va-c

Efficiency for Standard Two-Compartment Water Splitting

TABLE Va

| | Efficiency at 50° C. | | |
|---|---|---|---|
| % $H_2SO_4$ | % $Na_2SO_4$ | C | $\eta$ observed |
| 4.90 | 10.14 | .824 | .591 |
| 6.98 | 15.92 | .777 | .589 |
| 0 | 25.00 | 0 | .971 |
| 2.30 | 24.37 | .241 | .920 |
| 4.43 | 23.06 | .435 | .850 |
| 7.52 | 21.70 | .669 | .706 |
| 10.68 | 23.04 | .804 | .577 |
| 13.95 | 21.73 | .964 | .381 |

TABLE Vb

| | Efficiency at 45° C. | | |
|---|---|---|---|
| % $H_2SO_4$ | % $Na_2SO_4$ | C | $\eta$ observed |
| 4.87 | 10.09 | .823 | .581 |
| 6.87 | 15.02 | .797 | .578 |
| 0 | 24.96 | 0 | .970 |
| 2.31 | 23.79 | .247 | .902 |
| 4.37 | 23.49 | .425 | .842 |
| 7.46 | 21.93 | .660 | .695 |
| 10.55 | 23.09 | .797 | .559 |
| 14.10 | 21.80 | .968 | .371 |

TABLE Vc

| | Efficiency at 35° C. | | |
|---|---|---|---|
| % $H_2SO_4$ | % $Na_2SO_4$ | C | $\eta$ observed |
| 4.72 | 10.23 | .801 | .539 |
| 6.75 | 15.08 | .787 | .532 |
| 0 | 24.85 | 0 | .972 |
| 2.22 | 24.05 | .236 | .903 |
| 4.27 | 23.61 | .415 | .809 |
| 7.36 | 22.00 | .653 | .656 |
| 10.61 | 23.24 | .796 | .517 |
| 13.97 | 21.87 | .961 | .341 |

COMPARATIVE EXPERIMENT 6

Application of Multichamber Two-Compartment Water Splitting to Aqueous $Na_2SO_4$ A comparison of a prior art two-compartment electrodialytic water splitter with a preferred embodiment of the present invention systems for producing acidified $Na_2SO_4$ is made. Method 1 is a prior art two-compartment water splitter of FIG. 2a operated in a batch recirculation mode from zero conversion to a final conversion. The conversion, C, is defined as:

$$C = \frac{2 \times \text{moles } H_2SO_4}{\text{moles } H_2SO_4 + \text{moles } Na_2SO_4}$$

A conversion of 1 therefore corresponds to a solution of $NaHSO_4$. Batch recirculation corresponds to an infinite number of feed and bleed stages. A continuous process employing three stages would be slightly less efficient. Method 2 involves feeding a solution of salt to the second compartment $A_2$ of the two acid compartments cell illustrated in FIG. 5 with the output to the second compartment $A_2$ being fed to the first compartment $A_1$ as shown in FIG. 5. For the purposes of calculation, it is assumed that the second compartment $A_2$ is operated at the conversion fed to the first compartment, $A_1$, and the first $A_1$ at the conversion of the final product.

Figure 7:
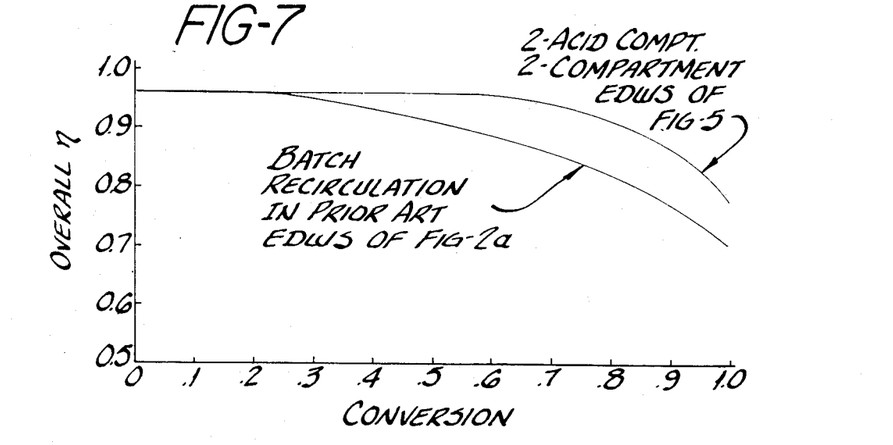

Using the quadratic equation of Experiment 5, calculation of the average efficiency which would be observed for various conversions by the batch recirculation method and the efficiency observed for the two cation membrane cell illustrated in FIG. 5 operated at various conversions was made for the three temperatures. The results are shown in Tables VI–VIII. These results at 50° are shown graphically in FIG. 7.

The results indicate that at conversions above 50 percent, the two cation membrane cell of FIG. 5 has significantly higher efficiency than the regular two-compartment cell.

The two cation membrane cell is, however, somewhat more complex than the conventional two-compartment cell and would operate at a "somewhat" higher voltage. Whether the two cation membrane cell would have an advantage over an ordinary two-compartment cell could only be determined by detailed engineering analysis and use tests. This analysis has assumed that the same membrane is used for both the cation membranes in the two cation membrane cell. It may be advantageous to use a low resistance, substantially non-porous, water-swollen cation membrane or perhaps even an uncharged substantially non-porous, water-swollen membrane to separate the two acid compartments. A lower voltage drop might be obtained in such a system but no data is available as to the transport of $Na^+$, $H^+$, and $SO_4^=$ across such membranes.

TABLE VI

Comparison of Calculated Current Efficiencies for Conversion of $Na_2SO_4$ to $NaHSO_4$ at 35° C. in Cells of FIGS. 2a and 5

| Conversion (C) of $Na_2SO_4$ to $NaHSO_4$[a] | Calculated Current Efficiencies for Conversion of $Na_2SO_4$ to $NaHSO_4$ | |
|---|---|---|
| $C^a$ | $\eta$ calc[b] | $\eta$ calc (2-shape)[c] |
| 0 | .970 | — |
| .101 | .960 | .969 |
| .200 | .947 | .968 |
| .301 | .929 | .965 |
| .400 | .908 | .959 |
| .500 | .883 | .949 |
| .600 | .852 | .932 |
| .700 | .815 | .905 |
| .800 | .771 | .864 |
| .900 | .717 | .801 |
| 1.000 | .650 | .706 |

[a] $C = 2 \times$ moles of $H_2SO_4$/moles of $H_2SO_4$ + moles of $Na_2SO_4$
[b] Batch Recirculation in Cell Illustrated in FIG. 2a
[c] Two Cation Membrane - Two Acid Compartment Cell of FIG. 5

TABLE VII

Comparison of Calculated Current Efficiencies for Conversion of $Na_2SO_4$ to $NaHSO_4$ at 45° in Cells of FIGS. 2a and 5

| Conversion (C) of $Na_2SO_4$ to $NaHSO_4$ | Calculated Current Efficiencies | |
|---|---|---|
| $C^a$ | $\eta$ calc[b] | $\eta$ calc (2-stage)[c] |
| 0 | .963 | — |
| .10 | .959 | .962 |
| .20 | .951 | .962 |
| .30 | .939 | .962 |
| .40 | .922 | .960 |
| .50 | .901 | .955 |
| .60 | .875 | .945 |
| .70 | .842 | .928 |
| .80 | .802 | .897 |
| .90 | .752 | .844 |
| 1.00 | .690 | .760 |

[b] Batch Recirculation in Cell Illustrated in FIG. 1
[c] Two Cation Membrane - Two Acid Compartment Cell of FIG. 5

TABLE VIII

Comparison of Calculated Current Efficiencies for Conversion of $Na_2SO_4$ to $NaHSO_4$ in Cells of FIGS. 2a and 5 at 50° C.

| Conversion (C) of $Na_2SO_4$ to $NaHSO_4$ | Current Efficiencies Calculated for Conversion of $Na_2SO_4$ to $NaHSO_4$ | |
|---|---|---|
| $C^a$ | $\eta$ calc[b] | $\eta$ calc[c] |
| 0 | .963 | — |
| .10 | .962 | .963 |
| .20 | .957 | .963 |
| .30 | .948 | .963 |
| .40 | .934 | .963 |
| .50 | .914 | .962 |
| .60 | .890 | .956 |
| .70 | .858 | .942 |
| .80 | .819 | .915 |
| .90 | .769 | .864 |
| 1.00 | .705 | .779 |

[b] Batch Recirculation in Cell Illustrated in FIG. 2a
[c] Two Cation Membrane - Two Acid Compartment Cell of FIG. 5

We claim:

1. A process for converting alkali metal sulfate values into alkali metal hydroxide and alkali metal sulfate/sulfuric acid which comprises the steps of:
   (a) providing an electrodialytic water splitter comprising at least one unit cell;
   (b) feeding liquid comprising water to a base compartment of each unit cell of the electrodialytic water splitter;
   (c) feeding liquid comprising spent rayon spin bath liquor containing alkali metal sulfate values to an acid compartment of each unit cell of the electrodialytic water splitter;
   (d) passing current through the electrodialytic water splitter to produce a reaction liquid comprising alkali metal sulfate/sulfuric acid in the acid compartment of each unit cell of the electrodialytic water splitter, and a reaction liquid comprising alkali metal hydroxide in said base compartment of each unit cell of the electrodialytic water splitter.

2. The process of claim 1 wherein the electrodialytic water splitter is a two-compartment water splitter, each unit cell comprising an acid compartment and a base compartment, the unit cell being formed by alternating cation and bipolar membranes.

3. The process of claim 1 wherein an average temperature of at least about 40° C. is maintained in the electrodialytic water splitter.

4. The process of claim 1 wherein the electrodialytic water splitter is a three-compartment electrodialytic water splitter, each unit cell consisting of a base compartment, an acid compartment and a salt compartment; the base, acid and salt compartments being formed by alternating cation, bipolar and anion membranes.

5. The process of claim 1 wherein the alkali metal is potassium.

6. The process of claim 1 wherein the alkali metal is sodium.

7. The process of claim 3 wherein the temperature in each compartment is at least about 45° C.

8. The process of claim 1 wherein the liquid fed into the acid compartment is untreated spent rayon spin bath liquor.

9. The process of claim 1 wherein the alkali metal sulfate values constitute about 10 to about 32 weight percent of the liquid fed to the acid compartment.

10. The process of claim 4 wherein the liquid fed into the salt compartment is pretreated spent rayon spin bath liquor.

11. The process of claim 10 wherein the pretreatment of the spent rayon spin bath liquor comprises:
   (a) neutralizing the spent rayon spin bath liquor; and
   (b) filtering the spent rayon spin bath liquor to obtain an aqueous, about 10 to about 32 wt. percent alkali metal sulfate, solution substantially free of organic and inorganic impurities.

12. The process of claim 10 wherein the pretreatment of the spent rayon spin bath liquor comprises:
   (a) treating the spent rayon spin bath liquor to produce crystallized glauber salt; and
   (b) forming an aqueous solution of the glauber salt wherein the alkaline metal sulfate concentration is between about 15 to about 32 weight percent of the aqueous solution.

13. The process of claim 12 further comprising the step of treating the aqueous solution of glauber salt with an alkaline metal base.

14. The process of claim 10 further comprising the step of:
  (d) producing a reaction liquid in the salt compartment which comprises between about 9 to about 12 weight percent $H_2SO_4$ and a reduced amount of alkali metal sulfate.

15. The process of claim 1 wherein the liquid comprising water further includes an alkali metal base in an amount between about 1 and about 50 weight percent.

16. The process of claim 1 wherein the reaction liquid comprising alkaline metal hydroxide contains between about 10 to about 20 weight percent of said alkali metal hydroxide.

17. The process of claim 1 wherein more than about 25 to about 50 weight percent of the alkali metal sulfate values are converted to alkaline metal sulfate/sulfuric acid.

18. The process of claim 17 wherein the acid compartment is a multi-staged acid compartment.

19. The process of claim 18 wherein the acid compartment is defined by a cation face of a bipolar membrane and a cation permselective membrane and wherein at least one non-porous, water-swollen membrane is interposed therebetween to define at least two acid subchambers which constitute the multi-staged acid compartment.

20. The process of claim 19 wherein the liqud comprising spent rayon spin bath liquor is fed to the acid subchamber adjacent the unit cell base compartment.

21. The process of claim 20 further comprising the steps of:
  (d) transferring the liquid from the acid subchamber adjacent the base compartment serially through all remaining subchambers; and
  (e) removing the reaction liquid comprising alkali metal sulfate/$H_2SO_4$ from an acid subchamber most remote from the unit cell base compartment.

22. A system for converting alkali metal sulfate values into alkali metal hydroxide and alkali metal sulfate/sulfuric acid comprising:
  (a) a source of spent rayon spin bath liquor containing alkali metal sulfate values;
  (b) a source of liquid comprising water;
  (c) an electrodialytic water splitter comprising at least one unit cell, each unit cell comprising a base compartment and at least one additional compartment;
  (d) a source of direct current connected to the electrodialytic water splitter;
  (e) means associated with the spent rayon spin bath liquor source and the electrodialytic water splitter for transporting spent rayon spin bath liquor to the at least one additional compartment;
  (f) means associated with the liquid source and the electrodialytic water splitter for feeding the liquid to the base compartment;
  (g) means associated with the at least one additional compartment for removing a reaction liquid therefrom; and
  (h) means associated with the base compartment for removing a reaction liquid therefrom.

23. A system as in claim 22 wherein the at least one additional compartment comprises an acid compartment.

24. A system as in claim 22 wherein the at least one additional compartment consists of an acid compartment and a salt compartment.

25. A system as in claim 23 wherein the means associated with the acid compartment is also associated with a rayon spin bath for supplying the acid compartment reaction liquid to the spin bath.

26. A system as in claim 22 wherein purification means are provided in the means for transporting spent rayon spin bath liquor for removing organic and inorganic impurities.

27. A system as in claim 26 further comprising spent rayon spin bath liquor treatment means in the means for transporting spent rayon spin bath liquor and arranged between the purification means and the at least one additional compartment for further treating the rayon spin bath liquor.

28. A system as in claim 23 wherein the acid compartment is defined by a cation face of a bipolar membrane and a cation permselective membrane and further includes at least one non-porous, water-swollen membrane interposed therebetween to define at least two subchambers in the acid compartment.

29. A system as in claim 28 wherein the means for transporting the alkali metal sulfate values is associated with the acid subchamber adjacent the unit cell base chamber and wherein the means for removing a reaction liquid from the acid chamber is associated with the acid subchamber most remote for the unit cell base chamber.

* * * * *

UNITED STATES PATENT AND TRADEMARK OFFICE
CERTIFICATE OF CORRECTION

PATENT NO. : 4,504,373

DATED : March 12, 1985

INVENTOR(S) : K. N. Mani et al.

It is certified that error appears in the above-identified patent and that said Letters Patent are hereby corrected as shown below:

Abstract, line 12, insert --a-- after "produce"

Column 1, line 22, insert --,-- after "Additionally"
Column 4, line 20, insert --,-- after "7"

Column 6, line 9, delete --,-- after "or"
Column 7, line 13, change "to" to --into--
         line 33, delete --,-- after "solving"

UNITED STATES PATENT AND TRADEMARK OFFICE
CERTIFICATE OF CORRECTION

PATENT NO. : 4,504,373

DATED : March 12, 1985

INVENTOR(S) : K. N. Mani et al.

It is certified that error appears in the above-identified patent and that said Letters Patent are hereby corrected as shown below:

Column 9, line 44, delete --cation-- after "water-swollen"
line 22, change "." to --,-- after "acrylamine" and insert --such as described in co-pending U.S. Patent Appl. Serial No. (Attorney's Docket 82-1974) which is hereby incorporated by reference. Exemplary uncharged membranes include crosslinked polyvinyl alcohol and cellulose-based membranes.

Column 14, line 58, "The" should be incorporated in the previous paragraph.

Signed and Sealed this

Twenty-second Day of October 1985

[SEAL]

Attest:

DONALD J. QUIGG

Attesting Officer

Commissioner of Patents and Trademarks—Designate

UNITED STATES PATENT AND TRADEMARK OFFICE
CERTIFICATE OF CORRECTION

PATENT NO. : 4,504,373
DATED : March 12, 1985
INVENTOR(S) : K. N. Mani, F. P. Chlanda It is certified that error appears in the above-identified patent and that said Letters Patent are hereby corrected as shown below:

Column 1, line 11, insert --,-- after "1982"

Column 5, line 28, delete -- - -- after "value"

Column 5, line 45, change "11b" to --116--

Column 7, line 33, add --.-- after "production"

Column 8, line 61, delete --are-- after "be"

Signed and Sealed this

Twenty-eighth Day of January 1986

[SEAL]

Attest:

DONALD J. QUIGG

*Attesting Officer*   *Commissioner of Patents and Trademarks*